(12) United States Patent
Sonda et al.

(10) Patent No.: US 8,520,339 B2
(45) Date of Patent: Aug. 27, 2013

(54) SLIDER DESIGN FOR DIVERTING AIRFLOW AWAY FROM A TRANSDUCER

(75) Inventors: Paul J. Sonda, Minneapolis, MN (US); Lars H. Ahlen, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 246 days.

(21) Appl. No.: 12/554,665

(22) Filed: Sep. 4, 2009

(65) Prior Publication Data

US 2011/0058278 A1  Mar. 10, 2011

(51) Int. Cl.
*G11B 5/60* (2006.01)

(52) U.S. Cl.
USPC ............. 360/235.7; 360/236.5; 360/237

(58) Field of Classification Search
USPC .......... 360/235.4, 235.5, 235.7, 235.8, 236.3, 360/236.5, 236.6, 237
See application file for complete search history.

(56) References Cited

U.S. PATENT DOCUMENTS

| | | | |
|---|---|---|---|
| 5,062,017 A | 10/1991 | Strom et al. | |
| 5,343,343 A | 8/1994 | Chapin | |
| 5,425,750 A | 6/1995 | Moberg | |
| 6,188,547 B1 | 2/2001 | Gui et al. | |
| 6,304,418 B1 | 10/2001 | Boutaghou et al. | |
| 6,980,399 B2 | 12/2005 | Rajakumar et al. | |
| 6,989,967 B2 | 1/2006 | Pendray et al. | |
| 7,256,965 B2 | 8/2007 | Rao et al. | |
| 2004/0095680 A1* | 5/2004 | Takahashi | 360/236.3 |
| 2005/0237668 A1* | 10/2005 | Cha et al. | 360/235.6 |
| 2006/0285248 A1 | 12/2006 | Pust et al. | |
| 2007/0058296 A1* | 3/2007 | Hashimoto et al. | 360/234.3 |
| 2007/0146933 A1* | 6/2007 | Matsumoto | 360/234.3 |
| 2007/0236838 A1* | 10/2007 | Knigge et al. | 360/235.8 |
| 2008/0123220 A1* | 5/2008 | Kajitani | 360/236.3 |
| 2011/0149429 A1* | 6/2011 | Koike et al. | 360/75 |

* cited by examiner

*Primary Examiner* — Jefferson Evans
(74) *Attorney, Agent, or Firm* — Fredrikson & Byron PA (57) ABSTRACT

This disclosure is directed to air-bearing sliders used in magnetic storage systems that employ a trench arranged between a transducing head connected to a slider body and a leading edge of the slider body. The trench is configured to divert air passing over an air-bearing surface of the slider body away from the transducing head.

19 Claims, 6 Drawing Sheets

SLIDER DESIGN FOR DIVERTING AIRFLOW AWAY FROM A TRANSDUCER

BACKGROUND

Magnetic data storage devices generally include magnetic recording heads, commonly referred to as transducing heads, which detect and modify the magnetic properties of a magnetic storage medium to store data.

Air-bearing sliders have been used in magnetic disc drives to appropriately position the transducing head above the rotating magnetic disc. During operation, the disc rotates at high speeds, which generates a stream of air flow immediately adjacent to the flat surface of the disc. This stream of air acts upon a lower air-bearing surface of the slider and generates a force directing the slider away from the disc and against a load beam causing the slider to "fly" a small distance above the disc. As magnetic disc storage systems are designed for greater and greater storage capacities, the aerial density of magnetic discs is increasing, requiring that the air-bearing gap between the transducer carried by the slider and the rotating magnetic disc be reduced, which in turn results in operating the air-bearing slider at ultra-low fly heights.

One cause of transducing head and disc collision is heat-induced protrusion of the transducing head toward the disc. Generally speaking, the materials from which transducing head components are made have relatively large coefficients of thermal expansion, and, therefore, are particularly subject to shape changes caused by variations in temperature. During operation, the various layers of the transducing head are heated by, e.g., electrical resistance generated as a result of the operation of the magnetic read and write heads included in the transducing head. Heating the transducing head causes the head to expand, and thereby protrude toward the magnetic disc. In ultra-low fly height applications, even small protrusions of the transducing head can cause head-to-disc collisions.

Recently, magnetic disc storage systems have seized on the heat-induced protrusion of transducing heads as a way to maintain small air-bearing gaps and, simultaneously, increase fly heights. Increasing fly heights has the obvious benefit of reducing the number and/or risk of collision with the magnetic disc. By employing electrical heaters in the transducing head, the amount the head protrudes during operation, and thereby the size of the air-bearing gap can be controlled as a function of the power applied to the heaters to induce protrusion of the transducing head toward the magnetic disc. Because the heat-induced protrusion of the transducing head is controlled to position the head relative to the disc as necessary for optimal performance, the fly height of the slider carrying the head can be increased.

SUMMARY

In general, magnetic storage systems and devices are disclosed in which a slider including a transducing head employs a trench that diverts air passing between the air-bearing surfaces of the slider and a magnetic medium above which the slider is positioned away from the transducing head. For example, a magnetic storage system includes a slider body, a transducing head, and a trench. The slider body has an air-bearing surface defined by a leading edge, a trailing edge, and two side edges connecting the leading and trailing edges. The transducing head is arranged toward the trailing edge of the slider body. The trench is arranged between the leading edge of the slider body and the transducing head. The trench is configured to divert air passing over the air-bearing surface of the slider body away from the transducing head.

In another example, a system includes a data storage member including a magnetic storage medium. The magnetic storage medium has a plurality of magnetic bit domains aligned on at least one data track. The system also includes a magnetic recording head arranged proximate the magnetic storage medium. The magnetic recording head includes a slider, a transducing head, and a trench. The slider has an air-bearing surface defined by a leading edge, a trailing edge, and two side edges connecting the leading and trailing edges. The transducing head is arranged toward the trailing edge of the slider. The trench arranged between the leading edge of the slider and the transducing head and is configured to divert air passing over the air-bearing surface of the slider away from the transducing head.

In one example, a magnetic storage system includes a slider body, a transducing head, and a material void. The slider body has an air-bearing surface defined by a leading edge, a trailing edge, and two side edges connecting the leading and trailing edges. The transducing head is arranged toward the trailing edge of the slider body. The material void is arranged between the leading edge of the slider body and the transducing head.

The details of one or more examples are set forth in the accompanying drawings and the description below. Other features, objects, and advantages of the invention will be apparent from the description and drawings, and from the claims.

DETAILED DESCRIPTION

As described above, magnetic disc storage systems have recently seized on the heat-induced protrusion of transducing heads as a way to maintain small air-bearing gaps and, simultaneously, increase fly heights. Transducing heads that employ controlled heat-induced protrusion have, however, introduced new design challenges for magnetic storage systems. Traditionally, air-bearing design has sought to maximize air-bearing surface pressure near the transducer in order to increase the dynamic stability of the transducer and slider, which in turn minimizes fly height sensitivity to manufacturing variation, environmental factors, and disk roughness. However, this increase in localized pressure, generally beneficial for fly performance, causes some cooling of the transducing head. Cooling of the transducer decreases the efficiency of heat-induced protrusion because more power is required for the transducer heaters to sufficiently displace the transducer toward the magnetic disc.

Magnetic storage systems and devices are therefore disclosed in which a slider including a transducing head employs a trench that diverts air passing between the air-bearing surfaces of the slider and a magnetic medium above which the slider is positioned away from the transducing head. In this manner, the air-bearing slider maintains many of the benefits of high air-bearing surface pressure, while reducing localized cooling of the transducing head and thereby increasing the efficiency of the heat-induced protrusion of the head.

Figure 1:
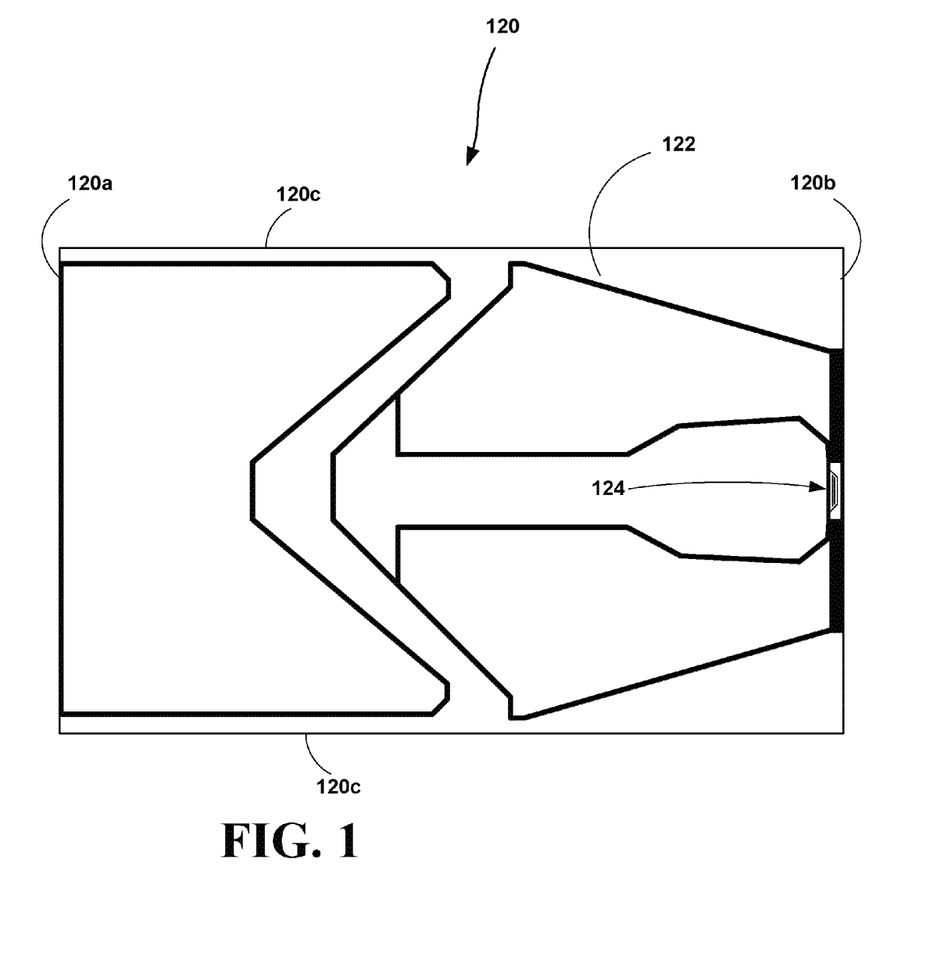
FIG. 1 is a schematic diagram illustrating an air-bearing slider included in a magnetic recording head.

FIG. 1 is a schematic diagram of air-bearing slider body 120 of a magnetic recording head, which includes air-bearing surface 122 defined by leading edge 120a, trailing edge 120b, and two side edges 120c connecting the leading and trailing edges. Air-bearing slider 120 also includes transducing head 124. As shown in FIG. 2, transducing head 124 is arranged toward trailing edge 120b of slider body 120. Air-bearing surface 122 is designed to control the aerodynamic performance of slider body 120 as it flies over a rotating magnetic disc. In particular, air-bearing surface includes structural features such as rails, lands, ramps, depressions and the like that are designed to maximize the air-bearing surface pressure created by the stream of air flowing between surface 122 and the disc near transducer 124. Maximizing pressure at transducer 124 acts to increase the stiffness of the suspension assembly of the magnetic recording head at transducer 124. Increasing the stiffness makes the suspension assembly, e.g. an actuator arm, and thereby the recording head, less subject to system vibration during operation, which in turn minimizes fly height sensitivity to manufacturing variation, environmental factors, and disk roughness.

Figure 2A:
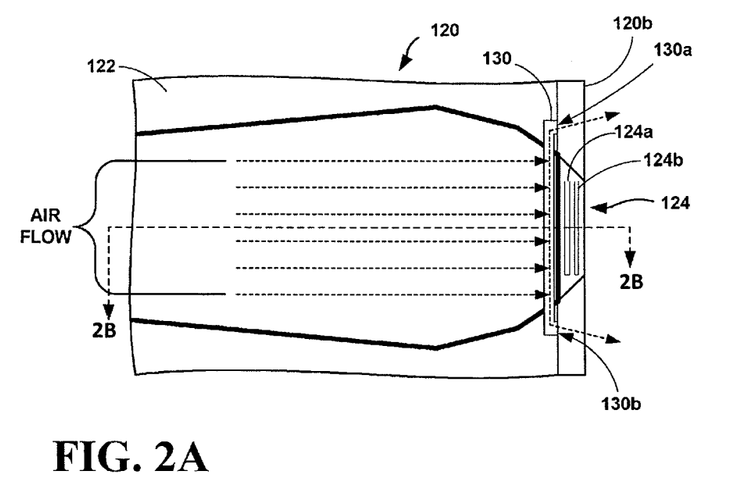
FIGS. 2A and 2B are detail views of a slider in the region of the transducing head including a trench that diverts air away from the transducing head.
Figure 2B:
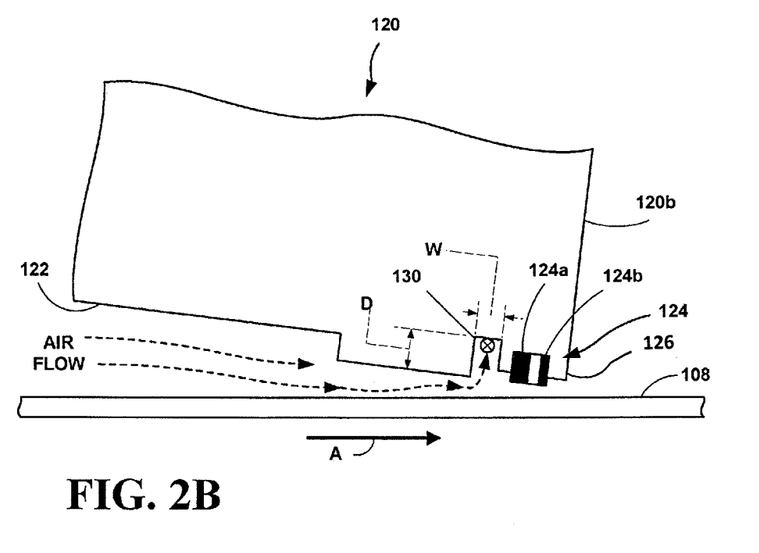

Transducing head 124 employs heat-induced protrusion 126 to position the read/write components of the head in close proximity to magnetic storage disc 108 (shown in FIG. 2B). To increase dynamic stability slider body 120 is designed to increase the overall stiffness of the slider and the suspension assembly to which it is attached. However, increasing air-bearing surface pressure at transducing head 124 causes some cooling of the transducing head. Cooling of transducing head 124 reduces the efficiency of heat-induced protrusion 126, requiring more power to displace the head into the proper position with respect to disc 108. As shown and described in detail with respect to FIGS. 2-6, examples disclosed herein, therefore, employ a trench that diverts air passing between the air-bearing surfaces of slider body 120 and magnetic storage disc 108 away from transducing head 124. In this manner, slider body 120 maintains many of the benefits of high air-bearing surface pressure, while reducing localized cooling of transducing head 124 to increase the efficiency of the heat-induced protrusion 126 of the head.

As used herein, the term trench refers to any material void in the slider body or transducing head of a magnetic recording head that is configured to divert air passing over the air-bearing surface of the slider body away from the transducing head. Therefore, the term trench contemplates material voids commonly referred to by different terms including, e.g., channel, canal, gutter, pocket, and cut, and cavity, concavity, depression, hollow, and the like.

FIGS. 2A and 2B are detail views of slider body 120 in the region of transducing head 124. FIG. 2A is a plan view of air-bearing surface 122 of slider 120 at trailing edge 120a.

FIG. 2B is a section view of slider body 120 at trailing edge 120b cut along section line 2B shown in FIG. 2A. Slider body 120 includes air-bearing surface 122, transducing head 124, and trench 130. Transducing head 124 includes write head 124a and read head 124b. As shown in FIGS. 2A and 2B, transducing head 124 and trench 130 are arranged toward trailing edge 120b of slider body 120. As shown, the trench 130 is positioned adjacent to transducing head 124, and is arranged just upstream, in the direction of air flow between air-bearing surface 122 and disc 108, of transducing head 124.

As schematically indicated by arrow A in FIGS. 2A and 2B, disc 108 rotates at high speeds during operation. Rotation of disc 108 generates a stream of air flow immediately adjacent to the flat surface of the disc, i.e. the air-bearing surface of the disc. This stream of air, which is indicated by dashed lines in FIGS. 2A and 2B, acts upon air-bearing surface 122 of slider body 120 and generates a force directing the slider away from disc 108 and against a load beam causing the slider and transducing head 124 to "fly" a small distance above the disc. The fly height of transducing head 124 above disc 108 is controlled, at least in part, by adjusting the aerodynamic performance of slider body 120 and the stiffness of the load beam. To further control the gap between transducing head 124 and disc 108, the transducing head employs heaters, e.g. electrical resistance heaters that modulate the temperature of the transducing head to cause it to protrude from slider body 120 toward disc 108. Controlled heat-induced protrusion 126 of transducing head 124 maintains a small air-bearing gap between the transducing head and disc 108, and, simultaneously, increases the overall fly height of slider body 120 over the disc.

The performance of the heat-induced protrusion system employed by transducing head 124 may be expressed as the stroke efficiency of the transducing head, which is equal to the amount a transducer head component (typically writer 124a or reader 124b) is displaced per unit of applied power. Any cooling of transducing head 124 during operation will act to degrade the stroke efficiency of heat-induced protrusion, because more power must be applied to achieve the desired displacement of the head toward disc 108. Therefore, trench 130 is employed to divert the air passing over air-bearing surface 122 of slider body 120 away from transducing head 124, which reduces cooling of the transducing head caused by the high air pressures generated by the slider during operation. As illustrated in FIGS. 2A and 2B, the air flow passing between air-bearing surface 122 and disc 108 drops into trench 130 immediately before reaching transducing head 124. Trench 130 includes first outlet 130a and second outlet 130b that exhaust air from inside the trench toward trailing edge 120b of slider body 120 on either side of transducing head 124.

As shown in FIG. 2B, trench 130 has a width W and depth D. In some examples, trench 130 is twice as deep as it is wide. In one example, depth D of trench 130 is approximately 2 microns and width W of the trench is approximately 1 micron. In another example, depth D of trench 130 is approximately 4 microns and width W of the trench is approximately 10 microns. In one more example, depth D of trench 130 is approximately 4 microns and width W of the trench is approximately 5 microns. As further shown in FIG. 2B, the trench 130 includes two side faces protruding from a floor to define an opening to receive the air diverted from the transducer, wherein a first of the two side faces is oriented toward the leading edge 120a and a second of the two side faces is oriented toward the trailing edge 120b, the first side face having a greater depth than the second side face.

Figure 3A:
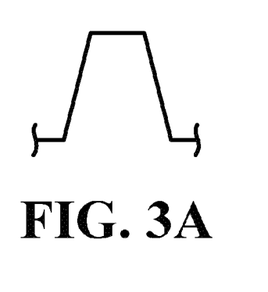
FIGS. 3A-3H illustrate a number of profile shapes for the trench of FIGS. 2A and 2B.
Figure 3B:
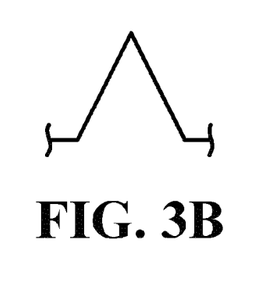
Figure 3C:
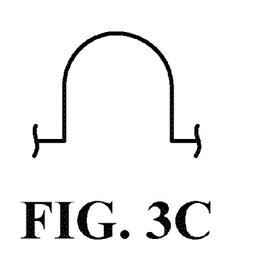
Figure 3D:
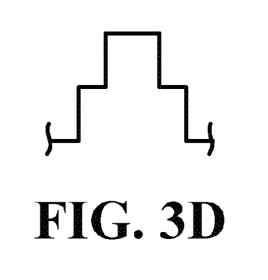
Figure 3E:
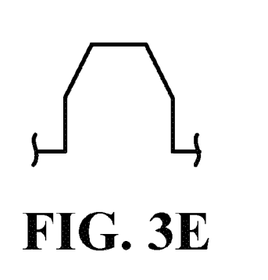
Figure 3F:
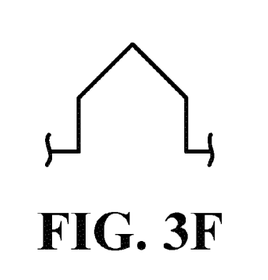
Figure 3G:
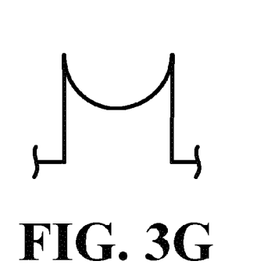
Figure 3H:
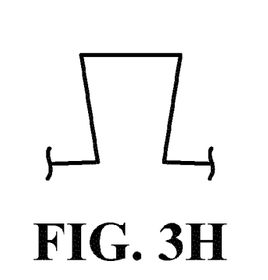

Trench 130 may have a number of profile shapes, examples of which are illustrated schematically in FIGS. 2B and 3A-3H. In FIG. 2B, trench 130 includes a generally rectangular profile. In the examples of FIGS. 3A-3D, however, trench 130 includes generally trapezoidal, triangular, arcuate, and stepped shapes respectively. More generally, trench 130 includes a floor and two side faces protruding from the floor to define an opening to receive the air diverted from transducing head 124. In some examples, the side faces protrude generally perpendicular from the floor, as illustrated in FIGS. 3C and 3G. In other examples, the side faces the side faces protrude at one of an obtuse or an acute angle from the floor, as illustrated in FIGS. 3A and 3H respectively. Each of the side faces of trench 130 may also include a first portion protruding at an obtuse angle from the floor and a second portion protruding from the first portion generally perpendicular to the floor, as illustrated in FIG. 3E. In some examples, the floor of trench 130 includes a generally concave or a convex shape, as illustrated in FIGS. 3C, 3F and 3G.

Magnetic recording head components are generally manufactured by material deposition and etching at very small dimensions. Slider body 120 and transducing head 124 are produced through such processes, but because of the relative size of the two components (the slider body is commonly on the order of 1,000 times the size of the transducing head), they may be produced as part of distinct processes from different materials. In general, trench 130 may be incorporated into the manufacturing process of either slider body 120 or transducing head 124. In some examples, trench 130 is produced as part of the manufacture of slider body 120 by etching the trench into the slider material as close to the material break between the slider and transducing head 124 as is practicable. In some examples, slider body 120 is manufactured from AlTiC, while the substrate for transducing head 130 is manufactured from $Al_2O_3$. Process variation and thereby dimensional tolerance variation of trench 130 may be difficult or impractical to control with this manufacturing approach. It may, therefore, be necessary to minimize etching feature misalignments and use an etch process that is capable of small trench widths including, e.g., Reactive Ion Etching. In other examples of manufacturing slider body 120 and transducing head 124 with trench 130, material that will eventually form the trench is deposited during the wafer manufacturing process of the transducing head and then removed during the etching of the slider. While generally increasing the complexity of the manufacturing process, such examples would allow for smaller process variations, which in turn more reliably produce smaller trench sizes.

FIGS. 2A and 2B are schematic illustrations of slider body 120, trench 130, and transducing head 124 and do not necessarily accurately represent the absolute or relative size of components in a magnetic recording head. For example, trench 130 is several orders of magnitudes larger than transducing head 124. The size of trench 130 is measured in, e.g., microns, while the size of transducing head 124 is measured in angstroms. However, for clarity in illustrating the various components and their arrangement with respect to each other, trench 130 and transducing head 124 are illustrated as similarly sized components.

Figure 4:
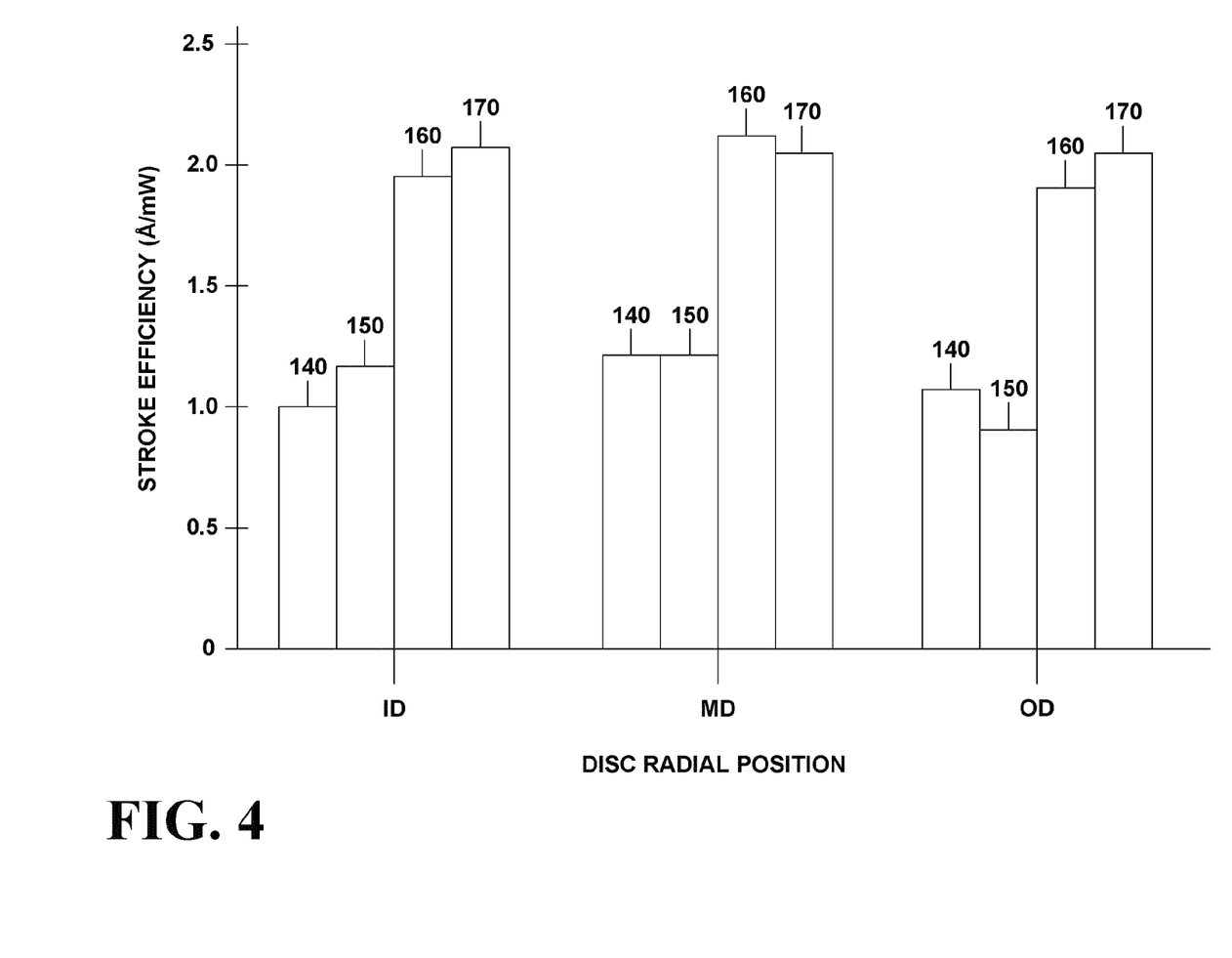
FIG. 4 is a bar chart of transducing head stroke efficiency as a function of disc radius that illustrates results from a performance simulation of four different slider designs.
Figure 5:
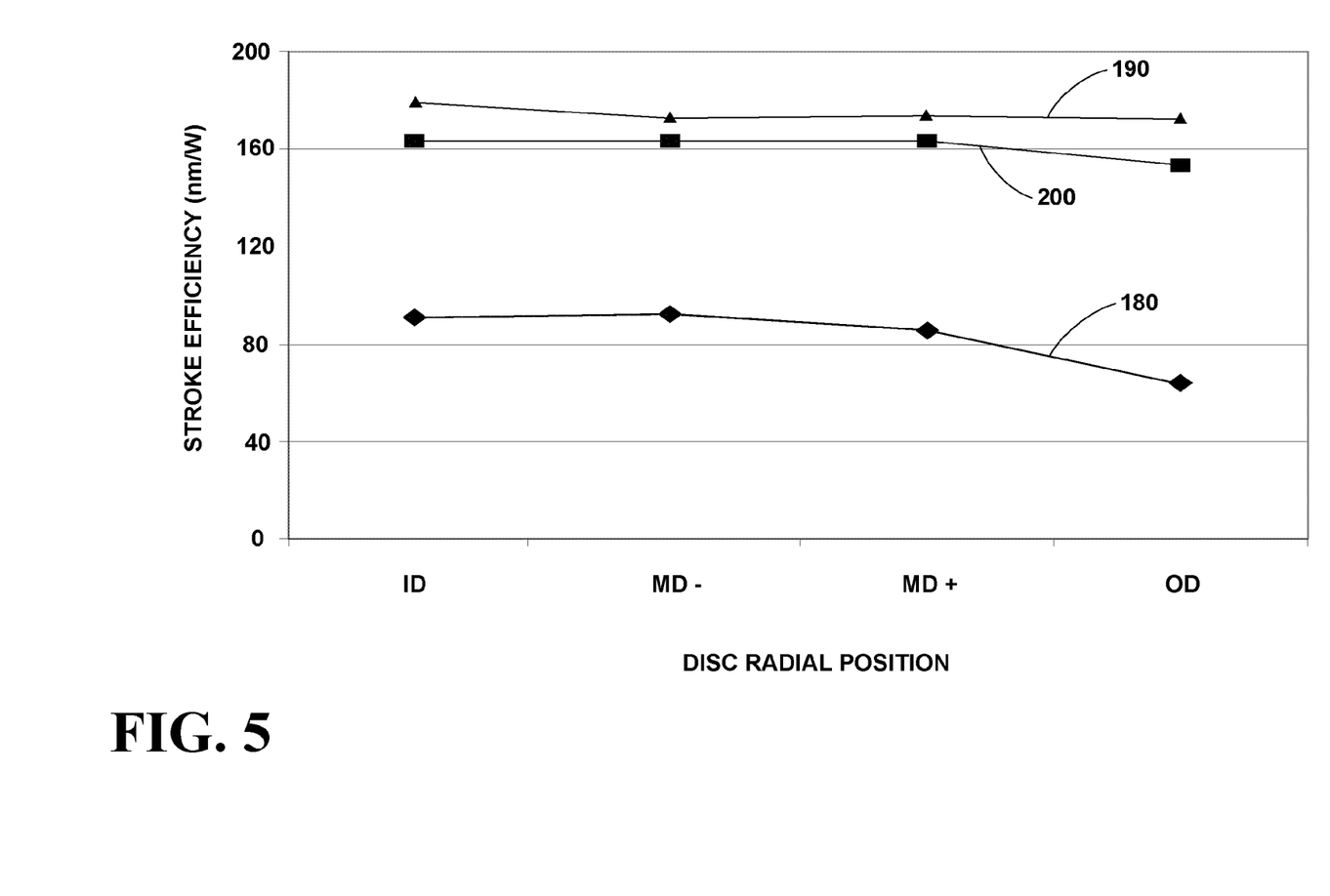
FIG. 5 is a line graph of stroke efficiency versus disc radius that illustrates the results of tests performed on one control slider design and two trench-modified slider designs.

To quantify the benefits of employing a trench to divert air away from a magnetic recording head transducer, thermomechanical simulations of four pertinent air-bearing slider designs were performed. The simulation results are shown in FIG. 4, which is a bar chart showing transducing head stroke efficiency (in angstroms/milliwatts) as a function of disc radius. Performance data was taken at three radial positions generally referred to in FIG. 4 as the outer diameter, OD, the middle diameter, MD, and the inner diameter, ID. The bar chart of FIG. 5 shows the stroke efficiency of each of designs 140, 150, 160, and 170 at each of the OD, MD, and ID radial positions. The designs included in the simulation were: a standard high pressure design 140; a high pressure design 150 with improved fly-height altitude sensitivity; a low-pressure design 160 with poor passive sensitivities; a trench-modified design 170 with a 5 μm slider-level trench added to the standard high pressure design 140.

Magnetic recording head performance is often measured as a function of disc radius, because different performance characteristics vary as the recording head moves radially across the disc to different tracks. For example, both stroke efficiency and dynamic stability may vary at different disc radial positions. One cause of performance variation across the radius of the magnetic disc is the changing aerodynamic and resultant air pressure conditions at the magnetic recording head as the head moves to different radial positions above the disc. The actuation arm that carries the magnetic recording head in hard disc drives maintains a fixed angular position during operation of the drive. The entire arm, however, moves radially across the disc to position the recording head above different tracks. As a result of this design, the angle of attack of air flow incident on a magnetic recording head changes at different radial positions of the recording head above the disc. Changes in the air flow at slider body 120 of the magnetic recording head acts to change, e.g., stroke efficiency of transducing head 124. Stroke efficiency may be reduced, e.g., because the changing air pressures and the resultant amount of cooling caused thereby require more or less power per unit displacement of transducing head 124.

Referring again to FIG. 4, the simulation results demonstrate two significant benefits of employing a trench to divert air away from a magnetic recording head transducer. First, the trench design increases the average stroke efficiency of the transducing head over prior high and low pressure designs. Second, the trench reduces of stroke efficiency variation across the radius of the disk. As discussed earlier, the trench reduces pressure over the transducer, thus reducing self-compensation and cooling, resulting in larger stroke efficiencies. Note that even though stroke efficiency values for trench design 170 were comparable to other low-pressure designs, e.g. low-pressure design 160, simulations show that trench design 170 had superior sensitivity to passive and environmental variations including, e.g., the above described variations caused by changes in disc radial position.

In order to experimentally verify performance of the trench-modified design, two air-bearing slider designs including air diverting trenches were built and tested. The control design was the design 150 discussed with reference to the simulation study of FIG. 4. To test the trench concept, a trench was added to control design 150. Two trench modified designs were built and tested. One design included a trench that was 4 microns deep and 5 microns wide. The second design included a trench that was 4 microns deep and 10 microns wide. The results of the tests are shown in FIG. 5, which is a line graph of stroke efficiency (in nanometers/Watts) versus disc radius.

In FIG. 5, curve 180 represents the test results for the high pressure control design 160, curve 190 represents the test results for the 4×5 micron trench-modified design, and curve 200 represents the test results for the 4×10 micron trench-modified design. The stroke efficiency was measured at four disc radial positions including ID and OD, and two MD positions MD− and MD+. The radial positions corresponding to ID, MD−, MD+, and OD were equal to 2.00, 2.51, 3.35 and 4.57 centimeters respectively. The orientation of the slider body with respect to air-bearing surface air flow is commonly quantified by skew angle. The skew angle corresponds to the angle between a centerline of the slider body and the direction of air-bearing surface air flow incident on the slider. The skew angle at the ID, MD−, MD+, and OD positions was equal to −13.96, −5.00, 5.00, and 16.38 degrees respectively. As is apparent from the results of FIG. 5, the performance predicted by the simulations discussed with reference to FIG. 4 was verified experimentally. Stroke efficiency for the trench-modified designs went up by approximately 90% from the control design and sensitivity to disc radial position decreased.

Figure 6:
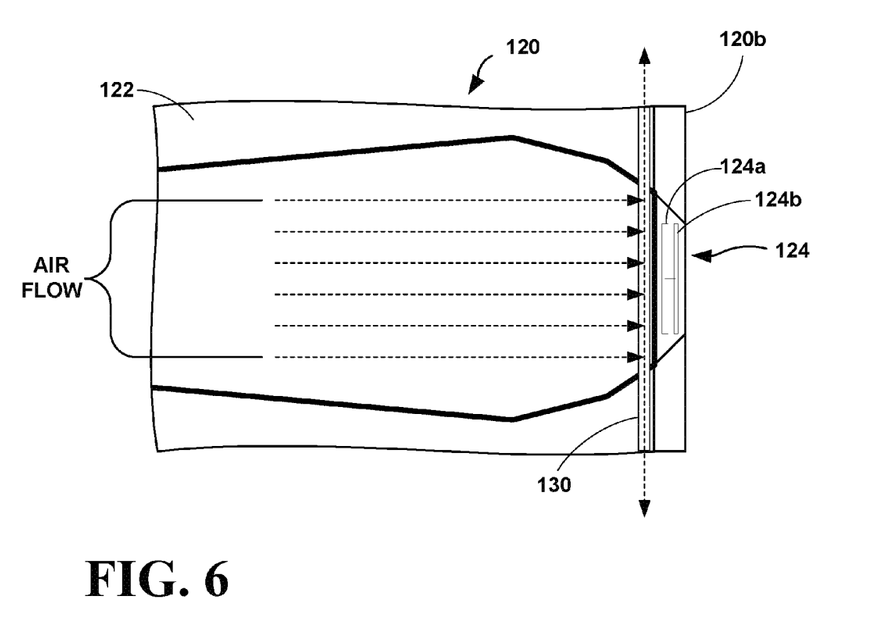
FIG. 6 is schematic diagram of an example slider that includes an alternative trench design.

FIG. 6 is a plan view of air-bearing surface 122 of slider 120 with an alternative trench design. Slider body 120 includes air-bearing surface 122, transducing head 124, and trench 210. Transducing head 124 includes write head 124a and read head 124b. As shown in FIG. 6, transducing head 124 and trench 210 are arranged toward trailing edge 120a of slider body 120. Trench 210 is arranged just upstream, in the direction of air flow between air-bearing surface 122 and disc 108 (not shown), of transducing head 124. The air flow passing between air-bearing surface 122 and disc 108 drops into trench 210 before reaching transducing head 124. Trench 210 is arranged generally perpendicular to and extends to side edges 120c of slider body 120 to exhaust air from inside the trench along two side surfaces of the slider body.

Examples disclosed herein provide several advantages over prior air-bearing sliders. In heat-induced protruding transducer applications, the disclosed examples increase stroke efficiency of the transducing head by diverting air away from the head, which in turn reduces cooling of the head caused by high air-bearing surface pressures. Reducing cooling of the transducing head reduces the power required to displace the head toward the magnetic storage medium above which it is arranged. Employing a trench to divert air away from the transducing head also reduces the sensitivity of the transducing head to passive environmental variations that correspond to changes in the radial position of the head over, e.g., a magnetic disc. Reducing sensitivity to radial position acts to increase the reliability of the recording head over a wider range of operating conditions.

Various examples have been described herein. These and other examples are within the scope of the following claims.

The invention claimed is:

1. A magnetic storage system comprising:
   a slider body having an air-bearing surface defined by a leading edge, a trailing edge, and two side edges connecting the leading and trailing edges;
   a transducer arranged toward the trailing edge of the slider body, said transducer comprising a heat-induced protrusion for displacing one or more elements of transducer out from the slider body; and
   a trench on the air-bearing surface proximate to the trailing edge, the trench positioned adjacent to the transducer so as to divert air passing over the air-bearing surface of the slider body immediately before the air passes over the transducer, thereby reducing cooling effect on the transducer and preventing degradation in stroke efficiency of the heat-induced protrusion, wherein the trench is directly formed in the air-bearing surface and the transducer is directly formed to the air-bearing surface such that the trench is located immediately upstream of the transducer, wherein the trench comprises a floor and two side faces protruding from the floor to define an opening to receive the air diverted from the transducer, wherein a first of the two side faces is oriented toward the leading edge and a second of the two side faces is oriented toward the trailing edge, the first side face having a greater depth than the second side face.

2. The system of claim 1, wherein the trench comprises a width and a depth, and wherein the depth is equal to two times the width.

3. The system of claim 2, wherein the depth of the trench comprises approximately 2 microns and the width of the trench comprises approximately 1 micron.

4. The system of claim 1, wherein a depth of the trench comprises approximately 4 microns and a width of the trench comprises approximately 5 microns.

5. The system of claim 1, wherein a depth of the trench comprises approximately 4 microns and a width of the trench comprises approximately 10 microns.

6. The system of claim 1, wherein the trench is arranged generally perpendicular to the two side edges.

7. The system of claim 6, wherein the trench extends to the two side edges to exhaust air from inside the trench along two side surfaces of the slider body.

8. The system of claim 6, wherein the trench comprises a first outlet and a second outlet that exhaust air from inside the trench toward the trailing edge of the slider body along a first lateral side and a second lateral side of the transducer.

9. The system of claim 1, wherein the trench comprises one of a generally rectangular, triangular, trapezoidal, arcuate, or stepped shape.

10. The system of claim 1, wherein the side faces protrude generally perpendicular from the floor.

11. The system of claim 1, wherein each of the side faces comprise a first portion protruding at an obtuse angle from the floor and a second portion protruding from the first portion generally perpendicular to the floor.

12. A magnetic storage system comprising:
    a slider body having an air-bearing surface defined by a leading edge, a trailing edge, and two side edges connecting the leading and trailing edges;
    a transducer arranged toward the trailing edge of the slider body, said transducer comprising a heat-induced protrusion for displacing one or more elements of transducer out from the slider body; and
    a trench on the air-bearing surface proximate to the trailing edge, the trench positioned adjacent to the transducer so as to divert air passing over the air-bearing surface of the slider body immediately before the air passes over the transducer, thereby reducing cooling effect on the transducer and preventing degradation in stroke efficiency of the heat-induced protrusion, wherein the trench is directly formed in the air-bearing surface and the transducer is directly formed to the air-bearing surface such that the trench is located immediately upstream of the transducer, wherein the trench comprises a floor and two side faces protruding from the floor to define an opening to receive the air diverted from the transducer and wherein the side faces protrude at one of an obtuse or an acute angle from the floor.

13. The system of claim 12, wherein the trench comprises a width and a depth, and wherein the depth is equal to two times the width.

14. The system of claim 12, wherein the trench is arranged generally perpendicular to the two side edges.

15. The system of claim 14, wherein the trench comprises a first outlet and a second outlet that exhaust air from inside the trench toward the trailing edge of the slider body along a first lateral side and a second lateral side of the transducer.

16. A magnetic storage system comprising:
    a slider body having an air-bearing surface defined by a leading edge, a trailing edge, and two side edges connecting the leading and trailing edges;
    a transducer arranged toward the trailing edge of the slider body, said transducer comprising a heat-induced protrusion for displacing one or more elements of transducer out from the slider body; and a trench on the air-bearing surface proximate to the trailing edge, the trench positioned adjacent to the transducer so as to divert air passing over the air-bearing surface of the slider body immediately before the air passes over the transducer, thereby reducing cooling effect on the transducer and preventing degradation in stroke efficiency of the heat-induced protrusion, wherein the trench is directly formed in the air-bearing surface and the transducer is directly formed to the air-bearing surface such that the trench is located immediately upstream of the transducer, wherein the trench comprises a floor and two side faces protruding from the floor to define an opening to receive the air diverted from the transducer and wherein the floor comprises one of a concave or a convex shape.

17. The system of claim 14, wherein the trench comprises a width and a depth, and wherein the depth is equal to two times the width.

18. The system of claim 14, wherein the trench is arranged generally perpendicular to the two side edges.

19. The system of claim 18, wherein the trench comprises a first outlet and a second outlet that exhaust air from inside the trench toward the trailing edge of the slider body along a first lateral side and a second lateral side of the transducer.

\* \* \* \* \*